United States Patent
Lintz et al.

(10) Patent No.: US 12,046,262 B2
(45) Date of Patent: Jul. 23, 2024

(54) CONTENT PLAYBACK CONTROL

(71) Applicant: Comcast Cable Communications, LLC, Philadelphia, PA (US)

(72) Inventors: Christopher Lintz, Denver, CO (US); Cory Zachman, Denver, CO (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 15/901,308

(22) Filed: Feb. 21, 2018

(65) Prior Publication Data

US 2019/0259424 A1  Aug. 22, 2019

(51) Int. Cl.
| | |
|---|---|
| G11B 27/34 | (2006.01) |
| G11B 27/00 | (2006.01) |
| H04N 21/439 | (2011.01) |
| H04N 21/4402 | (2011.01) |
| H04N 21/45 | (2011.01) |
| H04N 21/454 | (2011.01) |
| H04N 21/4545 | (2011.01) |
| H04N 21/654 | (2011.01) |
| H04N 21/81 | (2011.01) |
| H04N 21/8547 | (2011.01) |
| G10L 15/26 | (2006.01) |

(52) U.S. Cl.
CPC ............ *G11B 27/34* (2013.01); *G11B 27/005* (2013.01); *H04N 21/4394* (2013.01); *H04N 21/4396* (2013.01); *H04N 21/44029* (2013.01); *H04N 21/4532* (2013.01); *H04N 21/4542* (2013.01); *H04N 21/45457* (2013.01); *H04N 21/654* (2013.01); *H04N 21/8106* (2013.01); *H04N 21/8547* (2013.01); *G10L 15/26* (2013.01)

(58) Field of Classification Search
CPC ..... G11B 27/34; G11B 27/005; G10L 15/265; H04N 21/4396; H04N 21/44029; H04N 21/4532; H04N 21/654; H04N 21/8547
See application file for complete search history.

(56) References Cited

U.S. PATENT DOCUMENTS

| | | | | |
|---|---|---|---|---|
| 6,889,383 | B1 * | 5/2005 | Jarman | G11B 27/105 348/E5.002 |
| 7,111,009 | B1 * | 9/2006 | Gupta | G06F 17/241 369/30.08 |

(Continued)

FOREIGN PATENT DOCUMENTS

| | | |
|---|---|---|
| DE | 102015110621 A1 | 1/2016 |
| WO | 2017/026837 A1 | 2/2017 |

*Primary Examiner* — Daniel T Tekle
(74) *Attorney, Agent, or Firm* — BakerHostetler

(57) ABSTRACT

Systems and methods are described for retrieval and output of content in a way that addresses concerns with storing multiple copies or versions of a piece of content. The piece of content may have associated computer instructions that allow the client to access alternate portions of the piece of content during consumption. This allows the content provider to store a single copy of the complete piece of content while enabling consumers to access alternate audio or video portions of the content. A new playback architecture may execute instructions associated with a piece of content. Instructions associated with a piece of content may directly affect consumption by the consumer client and may be dependent upon user preferences or interests.

20 Claims, 7 Drawing Sheets

(56) References Cited

U.S. PATENT DOCUMENTS

| | | | |
|---|---|---|---|
| 7,437,290 B2 | 10/2008 | Danieli | |
| 7,801,910 B2 | 9/2010 | Houh et al. | |
| 7,889,964 B1 | 2/2011 | Barton et al. | |
| 8,473,630 B1* | 6/2013 | Galligan | H04N 21/2402 709/224 |
| 8,949,878 B2* | 2/2015 | Dimitrova | H04N 21/4542 725/28 |
| 2004/0261099 A1* | 12/2004 | Durden | H04N 7/163 725/32 |
| 2007/0168853 A1 | 7/2007 | Jarman | |
| 2009/0055189 A1 | 2/2009 | Stuart et al. | |
| 2009/0228492 A1 | 9/2009 | Valdez et al. | |
| 2010/0169786 A1 | 7/2010 | O'Brien et al. | |
| 2013/0064525 A1* | 3/2013 | Cary | G11B 27/105 386/285 |
| 2014/0200893 A1 | 7/2014 | Vanjani | |
| 2017/0026719 A1* | 1/2017 | Zhiwen | H04N 21/84 |
| 2018/0007448 A1* | 1/2018 | Gupta | H04N 9/8205 |

\* cited by examiner

CONTENT PLAYBACK CONTROL

BACKGROUND

Content providers may host content for users or subscribers of their services. Content may be hosted on one or more servers, and users may request and receive the content from these servers for presentation, interaction, or playback. Content may comprise one or more portions, such as a video portion and an associated audio portion. The video portion and the audio portion may share a presentation timeline so that the audio visually synchronizes with the video during playback. Content may need to be processed by a user device to parse the content into its different portions before the content is presented to the user. Each portion may then be sent to a playback module on the user device, which may interface with one or more output devices to present the content to the user.

Content providers may create several different copies of a piece of media content so that viewers have different options when consuming the piece of content. For example, a content provider may host a theatrical version of a movie and a version of the movie edited to omit language not suitable for younger audiences. Storing many versions of a piece of content may require the use of large amounts of computer memory and storage. Using such large amounts of computer memory and storage is inefficient because each version of the content may contain identical or similar sections to that of another version. For example, in each of the above examples of versions of a movie, the audio and video portions of one version are likely identical to the other version for much of the movie's running time.

SUMMARY

Systems and methods are described for the retrieval and output of content in a way that addresses concerns with storing multiple copies or versions of a piece of content. Alternate portions of a single piece of content may be stored in computer memory to access during consumption of the content to provide versioning features. When accessed by a consumer client, the piece of content may have associated computer instructions that allow the client to fetch these alternate portions during consumption. This allows the content provider to store a single copy of the complete piece of content while enabling client devices to fetch and output alternate audio or video portions of the content at certain times during playback. For example, a content provider may store a theatrical version of a movie. Instead of creating a second version of the movie with foul language dubbed over, the content provider may store portions of alternate audio separate from the movie that may be fetched and output by a consumer client during scenes with foul language.

In addition to instructions that enable alternate portions of content to be fetched and output at certain times, other instructions may also be executed. For example, an instruction may mute a portion of a movie or may seek to a specific presentation timestamp or a specific frame located at a specific presentation timestamp. Instructions may also be dependent upon user preferences or interests. For example, a user may set a preference to find portions of a video where a celebrity is mentioned. The audio of the video may be processed to determine timestamps when the celebrity is mentioned, and a seek instruction may be enabled during consumption of the video to allow the user to find portions of the video relevant to his or her interests.

A new playback architecture may include an instruction interpreter that determines the type and attributes of each instruction to be executed during playback. The architecture may also include an instruction scheduler that schedules execution of each instruction at a predetermined time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

Figure 1:
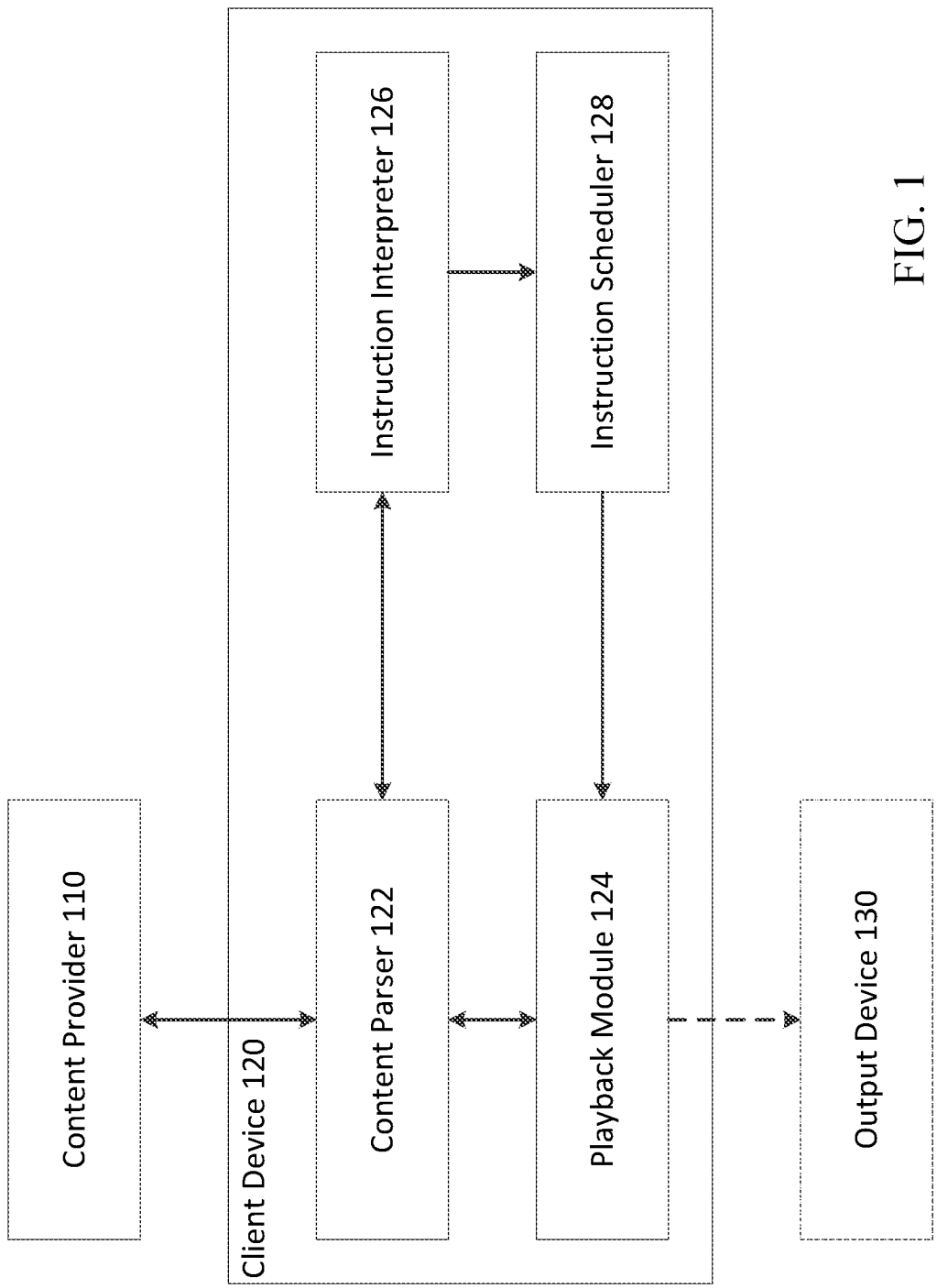
FIG. 1 shows an example of a system for consuming media content.

Electronic content is consumed on a daily basis. Articles, blogs, and documents are read; television shows and movies are watched; books are both read and heard; video games are played; software is executed. Much of this consumed content is consumed via smartphones, laptops, desktops, tablets, game consoles, and other computer systems, typically involving use of the Internet or other computer network.

Content providers host/store content that may be sent to users. A content provider may allow a user, or a subscriber, to download or stream content to a user device. The user may then consume the content on the user device. Different users may wish to consume different versions of a piece of content. For example, one user may want to watch a censored version of a video while another user may want to watch an unaltered version. Different users may also be interested in different portions of content. For example, one user may be interested in a particular celebrity while another may be interested in sports scores, both of which may be in the same piece of content.

To appease as many users as possible, a content provider may host several different versions of a piece of content. For example, a content provider may host an original version of a piece of content, a censored version of the piece of content, a version of the piece of content marked for celebrities, a version of the piece of content marked for sports scores, and any number of other versions of the piece of content. Hosting many versions of a piece of content increases computer memory usage and complicates the number and locations of network connections required to access different versions of the piece of content.

Systems and methods are described for the retrieval and output of content in a way that addresses concerns with storing multiple copies or versions of a piece of content. A single copy or version of a piece of content may be stored in computer memory. Alternate portions of the piece of content may also be stored to access during consumption of the content to provide the versioning features available in existing systems. When accessed by a user device, the piece of content may have associated computer instructions based on the user's preferences that allow the user device to access these alternate portions during consumption. For example, a content provider may store a theatrical version of a movie. Instead of creating a second version of the movie with foul language dubbed over, the content provider may provide instructions associated with the theatrical version that allow the user device to access alternate audio during scenes with foul language. A new architecture is introduced to enable the use of these new instructions. An instruction interpreter is introduced to determine the type and attributes of an instruction, and an instruction scheduler is also introduced to schedule execution of the instruction during playback. Existing system components may also be altered to recognize and execute instructions.

While examples may describe disclosed aspects with respect to their applicability to video content, the applicability of the disclosed aspects should not be construed as being limited to only video content.

A video file may be hosted on one or more streaming servers, and a user may request and receive the video file from one or more of those servers for playback. A video file may comprise a video portion and an audio portion associated with the video portion. The video portion and audio portion may have a corresponding presentation timeline so that the audio portion may visually synchronize with the video portion during playback.

A video file may be delivered to a user device in accordance with a manifest file. A manifest file for a video file may comprise a text file containing a list of network locations. Each network location may be specified in the form of a uniform resource locator (URL). These network locations may reference segments or fragments of the video file, such as two-second segments of the video file. The video file may be presented to the user by retrieving each segment of the video file using its respective URL listed in the manifest file and playing the retrieved segments for the user. Thus, the network locations (e.g., URLs) may need to be parsed from the manifest file before playback may occur. Playback may be performed by processing each retrieved segment at one or more audio and video decoders to present the segments of the video file to the user.

Instructions may be associated with a piece of content to enable different users to view different versions of the piece of content. When executed, such instructions may direct a user device to retrieve and/or present alternate content to the user at specified times. Such instructions may also allow a user to interact with a piece of content in a way not previously available. Instructions may be generated based on user preferences or interests collected by the content provider and may be performed concurrently with other instructions.

For example, in the case of a video file, new instructions may be introduced into a manifest file of the video file in-line at the beginning of, at the end of, or intermixed with the list of network locations of video file segments. When executed during playback of the video file, such instructions may play and/or retrieve alternate audio at specified time(s) (e.g., identified via respective timestamps) of the presentation timeline of the video file. Such instructions may also allow a user to seek to specific frames or times of interest so that the user may avoid watching the entirety of a video to find segments of interest. In an example, a mute instruction may mute audio of a video file during playback for a specified duration. In another example, a replace audio instruction may overlay specified audio on the video file during playback so a user is presented the replacement audio instead of the original audio at a time, specified by an associated timestamp, of the presentation timeline of the video file. In an additional example, a seek instruction may skip sections of the video file that do not correspond to a specified interest or keyword associated with the audio of the video file.

Instructions associated with a piece of content may be dependent upon user preferences or interests. A user may set one or more preferences with the content provider for content consumption. Preferences may be set via a user device, a web interface, or any other feasible method. In an example, as user may wish to find portions of a video file where a celebrity is mentioned. The audio portion of the video file may be processed to determine times when the celebrity is mentioned, and a seek instruction may be inserted into the manifest file of the video file to allow the user to seek to portions of the video file relevant to the celebrity without watching intervening portions of video. In another example, a user may set preferences to indicate a wish to censor foul language in a video file. The content provider may process the audio portion of the video file to find foul language and insert a mute instruction at times where foul language is found.

An instruction in a manifest file may take any suitable form recognizable by the client device. As such, content providers that distribute client devices to subscribers, such as cable companies, may be able to create proprietary instructions recognizable by only those client devices. Each instruction may have a specified type and one or more attributes specific to that type. For example, a volume instruction in a manifest file may have a type of "Volume" and associated attributes that convey the value the volume should take and the starting and ending times along the presentation timeline the volume instruction should be executed. Such an instruction may take the following form:
  COMMAND:TYPE=VOLUME, START=54000000, END=54002213, VALUE=0.

This instruction has a type having value "VOLUME", a starting presentation timeline timestamp attribute of "54000000", an ending presentation timeline timestamp attribute of "54002213", and a value attribute of "0". The client device may be programmed to determine that this instruction is to mute the audio of a video file during the presentation time [54000000-54002213] of the video file because volume with a value of zero may correspond to no sound being played. In other examples, a mute instruction may be used instead of a volume instruction to simplify the parsing process by requiring the parsing of one less attribute, i.e., the "value" attribute. Other forms of instructions may be used if the instructions may be recognized by the client device. For example, an instruction may take the form of a tag, such as an HTTP Live Streaming (HLS) tag with associated attributes. A mute instruction in an HLS manifest may comprise two tags as part of an EXT-X-AUDIO rendition, EXT-X-MUTE: START to begin muting and EXT-X-MUTE:END to end muting.

An instruction may also comprise relevant metadata that may be displayed to a user. For example, an instruction may comprise metadata relevant to the instruction's placement or utility. In an example where a user sets preferences to mute foul language, each mute or volume instruction may comprise a metadata attribute explaining that the instruction was included to mute foul language. This metadata may be displayed to the user to inform the user the audio was muted on purpose. An instruction's metadata may also be used in lieu of a specific attribute. For example, a replace audio instruction may use metadata to convey a network location of replacement audio. Such an instruction may take the form:

COMMAND:TYPE=REPLACE, START=5400000, END=54002213, METADATA:{"audioUrl": "http://cdn.comcast.com/00000188190/abc123.ac3'}

This instruction has a type having a value "REPLACE", a starting presentation timeline timestamp of "5400000", an end ending presentation timeline timestamp attribute of "54002213", and metadata with a value of {"audioUrl": "http://cdn.comcast.com/00000188190/abc123.ac3'}. The client device may determine that this instruction is to replace the audio of a video file with audio at the network location denoted by the metadata. The replacement should begin at presentation time 5400000 and continue until presentation time 54002213.

In another example, a seek instruction may comprise metadata denoting keywords to search for in an audio portion of a video file. Such an instruction may take the form:

COMMAND:TYPE=SEEK, PTS=360000, VALUE=5400000, METADATA: {"keywords": ["Donald Trump", "Hilary Chnton"]}

This instruction has a type having value "SEEK", a presentation timestamp attribute of "360000", a value attribute of "5400000", and metadata with a value of {"keywords": ["Donald Trump", "Hilary Clinton"]}. The client device may determine that at presentation timestamp 360000, this instruction is to seek to the next occurrence of "Donald Trump" or "Hilary Clinton" before presentation timestamp 5400000. Such an instruction may optionally be displayed at an application layer of the client device to allow users or subscribers to configure the value of PTS, the value of VALUE, and the value of the metadata. Further, in such examples, the users or subscribers may iterate through occurrences of found keywords. For example, using the above instruction, a user may iterate through each occurrence of "Donald Trump" or "Hillary Clinton" that is found between presentation timestamps 360000 and 5400000.

An instruction interpreter may determine the type of an instruction and attributes and/or metadata associated with the instruction, and an instruction scheduler may be introduced to monitor presentation of the piece of content and schedule execution of the instructions during presentation to the user. Existing components used for playback of the content may need to be modified to parse the instructions from the piece of content (e.g., from the manifest for the content) and accept and execute instructions from the instruction scheduler as the instructions are received. FIG. 1 shows one example of a system comprising these new components.

FIG. 1 shows an example of a system that may be used to enable aspects described herein. The example entities of FIG. 1 may be part of or use a computer network, which may be a small, home network or part of a large network such as the Internet, or a combination of both. Alternatively, the entities of FIG. 1 may be part of a single computer system.

A content provider 110 may be used by a provider of consumable content, such as a media company or other source of content from which a user may request content. For example, the content provider 110 may be used by a cable company, a TV or movie studio, a video game company, a software developer, or even a single user. The content provider 110 may be communicatively connected to one or more client devices, such as a client device 120, as shown in FIG. 1. In response to requests from the client device 120, the content provider 110 may transmit content items to the client device 120. Content items may comprise media that has been requested by a user. For example, a content item may be a movie, a song, a video game, etc. The content provider 110 may also collect or have access to user preferences regarding media presentation. Collection may occur via a client device, web interface, or any other feasible user interface.

A client device 120 may be used by a consumer to request content and for playback of content. For example, the client device 120 may be a set top box, a software program, a computing device, such as a laptop or desktop personal computer, a mobile device, such as a mobile phone or tablet, or any other device capable of requesting and receiving content. The client device 120 may be communicatively connected to the content provider 110 to send user requests and receive requested content. Requested content may arrive in varying forms. For example, a video may initially arrive in the form of a manifest, which may comprise a list of network locations hosting segments of audio and video. In an example, content may arrive in the form of one or many different files that may be stored and consumed directly from the client device 120.

The client device 120 may need to process received content before presenting the content to the user. To process such content, the client device 120 may comprise one or more modules. A content parser 122 may be one such module.

The content parser 122 may initially process a content item by determining the form of the content item. For example, the content parser 122 may determine that the content item is in the form of a video manifest or is a single file. Existing content parsers, such as the content parser 122, may be modified to recognize the newly introduced instruction set. The content parser 122 may then be able to parse the content item into instructions and consumable portions. The content parser 122 may send parsed instructions to an instruction interpreter 126, which may be also be a module of the client device 120. While parsing instructions from the content item, or after the parsing is complete, the content parser 122 may send the content item, or the consumable portions of the content item, to a playback module 124, which may also be a module of the client device 120. For example, the content parser 122 may parse a received manifest file to determine the location of a video segment, the location of an audio segment associated with the video segment, and any instructions associated with the video segment, audio segment, or both. The content parser 122 may pre-fetch any parsed replacement audio and/or video content in order to ensure that the transition to new content is seamless. A seamless transition may ensure the user does not experience any buffering or undesirable effects during playback. The content parser 122 may then send the instructions to the instruction interpreter 126 and the video segment and audio segment information, including any replacement audio information or video information, to the playback module 124. In an example, the content parser 122 may receive an audio file, such as a song. The audio file may arrive as a single file that has instructions associated with certain timestamps of the presentation timeline of the audio file. The content parser 122 may determine these instructions by parsing the audio file and then send these instructions to the instruction interpreter 126. Concurrently, the content parser 122 may send the audio file to the playback module 124. If there are instructions to replace audio with a specific audio file, the content parser 112 may retrieve the specific audio file and send that to the playback module 124 as well.

The instruction interpreter 126 may receive one or more instructions from the content parser 122 and may determine the type of each instruction and any attributes associated with each instruction. For example, the instruction interpreter 126 may receive an instruction associated with a movie and determine that the instruction is to mute the audio of the movie. A mute instruction may have start and end attributes corresponding to the presentation timeline of the movie. In this example, the instruction interpreter 126 may determine the instruction is to mute the audio for two seconds at a timestamp corresponding to one minute into the movie's associated presentation timeline. The instruction interpreter 126 may then send the instruction with the attributes associated with the instruction to an instruction scheduler 128, which may also be a module of the client device 120.

The instruction scheduler 128 may receive instructions from the instruction interpreter 126 and process attributes associated with each instruction. The instruction scheduler 128 may monitor presentation of the content to the user of the client device 120 and schedule the instructions by sending the instructions to the playback module 124 for execution at the appropriate time in accordance with any timestamp or other time-related attributes of each instruction. The instruction scheduler 128 may send the instructions to the playback module 124 as a large group, in small groups, individually, or any combination thereof. The instruction scheduler 128 may send the instructions at, or just before, the presentation time the instruction is supposed to execute so that the playback module 124 may execute the instructions just-in-time for the user. The instruction scheduler 128 may also send the instructions to the playback module 124 before the content is presented to the user so that the playback module 124 does not need to receive and immediately execute an instruction, but can instead wait until the appropriate time to execute the instruction.

The playback module 124 may receive content items, or the consumable portions of content items, from the content parser 122 and may determine how to present the content items to the user of the client device 120. In instances, the playback module 124 may be able to present the content to the user by itself. The playback module 124 may also comprise components that allow the playback module 124 to process and/or execute processes needed to present the received content to the user. For example, the playback module 124 may comprise one or more decoders that process audio and/or video content so that the content may be presented to the user. Additionally, the playback module 124 may comprise one or more displays and/or audio components. The playback module 124 may present content ready for user consumption directly, or the playback module 124 may send this content to an output device 130, which may or may not be a module of the client device 120. The playback module 124 may receive instructions from the instruction scheduler 128. These instructions may direct the playback module 124 to perform actions during presentation of the content. For example, an instruction may direct the playback module 124 to mute audio of a video file for a specified amount of time. The playback module 124 may need to execute such instructions as they arrive, or may ready such instructions before and/or during presentation to the user if received before execution time.

The output device 130 may be any device capable of presenting a content item to the user of the client device 120. For example, the output device 130 may be a display, speakers, a virtual reality headset, a combination thereof, or any other device capable of presenting the content to the user. The output device 130 may be permanently associated or a part of the client device 120. The output device 130 may also be a generic peripheral or other computer device capable of being communicatively connected to the client device 120 to perform presentation of content.

The content provider 110, the client device 120 and associated modules such as the content parser 122, the playback module 124, the instruction interpreter 126, the instruction scheduler 128, and the output device 130 may be physical or digital and take any suitable form for their described purposes. For example, they may take the form of software components on one or more computers or modules within a single software suite. Communicative connections between these entities may be physical connections, such as those via hardware circuits or LAN cables, wireless connections, such as those via WiFi or cellular, or any other suitable communicative connection.

The content provider 110 may provide various forms of audiovisual content to subscribers. A subscriber may receive a client device 120, such as a set top box, from the content provider 110 to access the content provider's 110 content. The client device 120 may be connected to an output device 130, such as the subscriber's television. The subscriber may request to watch a movie from the content provider 110 via the client device 120. In response, the content provider 110 may send a manifest file to the client device 120 to access the movie. The client device 120 may receive the manifest file and process the manifest file at a content parser 122. The content parser 122 may determine that the received file is a manifest file and parse the manifest file into various instructions and references to segments of the movie. In this example, there is a single instruction parsed from the manifest file. The content parser 122 may send the parsed instruction to an instruction interpreter 126. Concurrently, or after the parsing of the manifest file is complete, the content parser 122 may retrieve the movie segments from the parsed reference locations, which may be accessible via the content provider 110, and send the movie segments to a playback module 124 for playback. Movie segments may be retrieved in two-second fragments or any other feasible format.

The instruction interpreter 126 may receive the parsed instruction from the content parser 122 and may determine the instruction is to mute audio for two seconds, during presentation time range 5400000-5580000, which may correspond to 00:01:00-00:01:02 from the perspective of the subscriber, assuming a start time of 0 and an increment of 90,000 per second. The instruction interpreter 126 may then send the mute instruction with the presentation time range to an instruction scheduler 128. The instruction scheduler 128 may receive the mute instruction from the instruction interpreter 126 and process the presentation timestamp attributes to determine when to execute the mute instruction. The instruction scheduler 128 may monitor presentation of the content to the subscriber and schedule the mute instruction by sending the mute instruction to the playback module 124 in a just-in-time fashion, directly before the audio is to be muted.

As the instruction is being parsed and processed, the playback module 124 may receive the movie segments from the content parser 122 and may process the movie segments using a video decoder and an audio decoder. The playback module 124 may then send this decoded content to the subscriber's television so the subscriber is able to experience the movie. During playback of the movie, the playback module 124 may receive the mute instruction from the instruction scheduler 128. This mute instruction may direct the playback module 128 to mute the audio of the movie for the specified presentation time range 5400000-5580000. As the subscriber watches the movie, the audio is muted for the presentation time range 5400000-5580000, corresponding to 00:01:00-00:01:02 from the perspective of the subscriber.

A content provider 110, a client device 120, and an output device 130 may be software programs or software modules on a single computer. In this example, connections between components may be a hardware circuit on the computer, such as a bus. A user of this computer may create content with or store content with the content provider 110. Such content may be a home movie, a video game, a song, or other content. The user may use the client device 120 to open the content. The client device 120 may parse instructions from the content using a content parser 122 and send the instructions to an instruction interpreter 126 for processing. The content parser 122 may also send the consumable portions of the content to the playback module 124 to begin presentation to the user. The playback module 124 may begin presenting the content to the user via the output device 130. The output device 130 may be a video or audio device driver or any other component capable of presenting content to the user. The instruction interpreter 126 may receive the instructions and determine the types and attributes of the instructions, which the instruction interpreter 126 may then send to an instruction scheduler 128. The instruction scheduler 128 may process the instructions and associated attributes and send them to the playback module 124 for execution during presentation to the user. The user experiences the content and the effects of the instructions during playback.

Figure 2:
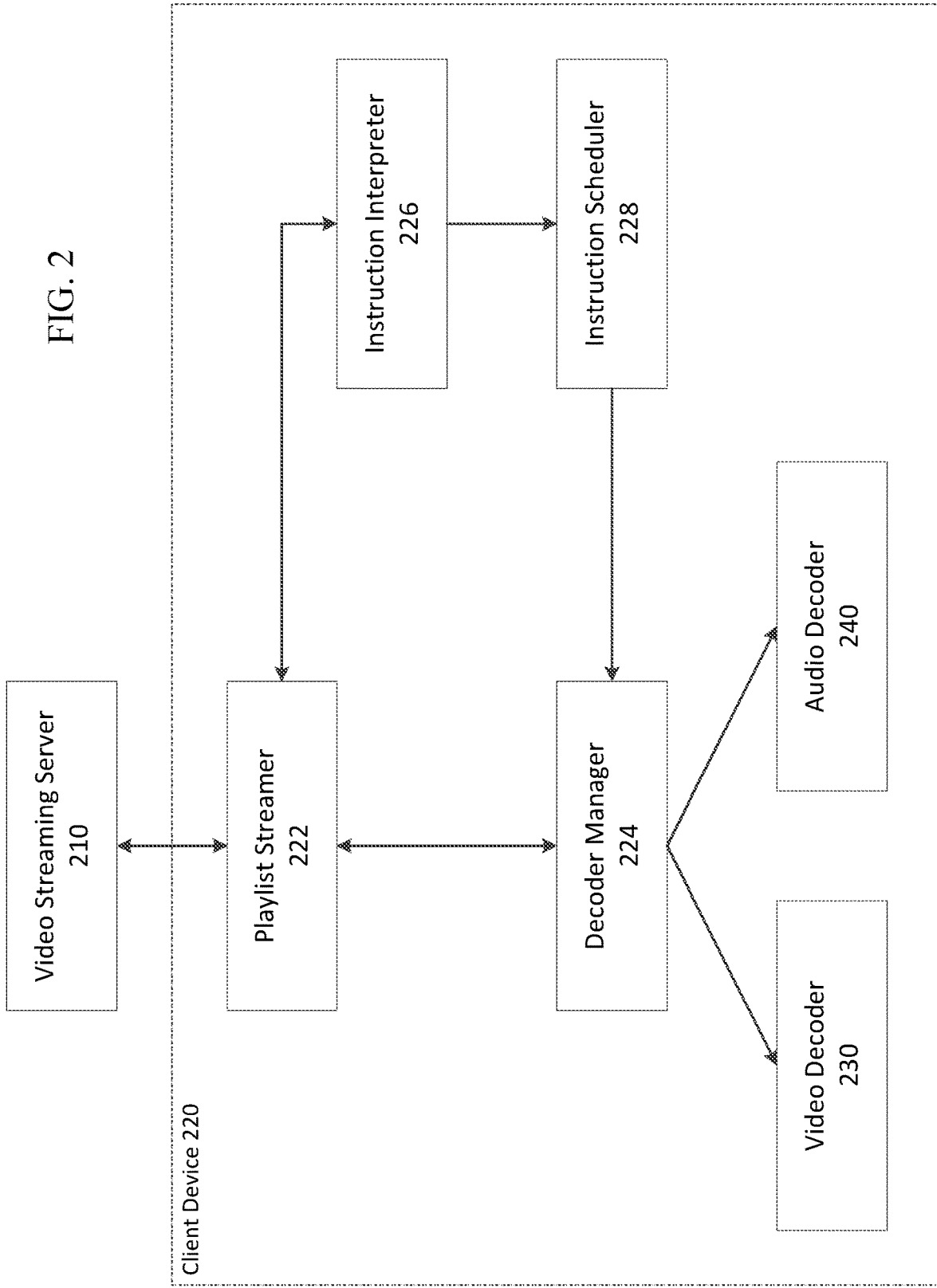
FIG. 2 shows an example of a system specialized for consuming video content.

FIG. 2 shows an example of a system that may be used to enable aspects described herein with regard to presenting video to a user. FIG. 2 may be a specialized form of the system shown and described with respect to FIG. 1. The example entities of FIG. 2 may be part of or use a computer network, which may be a small, home network or part of a large network such as the Internet, or a combination of both. Alternatively, the entities of FIG. 2 may be part of a single computer system.

A video streaming server 210 may be used by a provider of video content, such as a media company or other source of video content from which a consumer may request video content. For example, the video streaming server 210 may be used by a cable company or a TV or movie studio. The video streaming server 210 may be communicatively connected to one or more client devices, such as a client device 220, as shown in FIG. 2. In response to requests from the client device 220, the video streaming server 210 may transmit video content to the client device 220. The video streaming server 210 may also collect or have access to user preferences regarding media presentation. Collection may occur via a client device, web interface, or any other feasible user interface. User preferences may influence video content, or instructions associated with video content, transmitted to client devices. Video content may comprise video media that has been requested by a user. For example, a video content item may be a movie, a TV show, or other video media.

The client device 220 may be used by a consumer to request and for playback of video content. For example, the client device 220 may be a set top box, a computing device, such as a laptop or desktop personal computer, a mobile device, such as a mobile phone or tablet, a streaming device, or any other device capable of requesting and receiving video content. The client device 220 may be communicatively connected to the video streaming server 210 to send consumer requests and receive requested video content. Requested video content may initially arrive in the form of a manifest file, which may comprise a list of network locations hosting segments of audio and video that comprise the video content. The client device 220 may need to process received video content before presenting the video content to the consumer. The client device 220 may use a playlist streamer 222 to process the content, which may be a module of the client device 220.

The playlist streamer 222 may be a specialized form of a content parser, such as the content parser 122 of FIG. 1. The playlist streamer 222 may be aware of all custom instructions that may be found in a manifest file produced by the video streaming server 210. The playlist streamer 222 may process a received manifest file by parsing the manifest file into instructions and network locations. Then, the playlist streamer 222 may send the parsed instructions to an instruction interpreter 126, which may be also be a module of the client device 220. While parsing instructions from the manifest file, or after the parsing is complete, the playlist streamer 222 may retrieve the audio and video segments of the video content item from their respective parsed network locations. The playlist streamer 222 may then send the audio and video segments of the video content item to a decoder manager 224, which may also be a module of the client device 220. The decoder manager 224 may be a specialized form of a playback module, such as the playback module 124 of FIG. 1.

The instruction interpreter 226 may receive one or more instructions from the playlist streamer 222 and may determine the type of each instruction and any attributes associated with each instruction. For example, the instruction interpreter 226 may receive an instruction associated with a video and determine that the instruction is to replace the audio of the video. A replace audio instruction may have a network location attribute and start and end attributes corresponding to the presentation time of the video during which the audio should be replaced. In this example, the instruction interpreter 226 may determine the instruction is to replace the audio with the audio located at the network location for two seconds at a timestamp corresponding to one minute in the video's associated presentation timeline. The instruction interpreter 226 may send the network location of the replacement audio to the playlist streamer 222 so that the playlist streamer 222 may retrieve the replacement audio and send the replacement audio to the decoder manager 224, which will wait to play the audio until instructed to do so. Alternatively, the playlist streamer 222 may have already retrieved the replacement audio before sending the parsed instructions to the instruction interpreter 226. This pre-fetching may help ensure a user will experience smooth playback and not experience any buffering or other undesirable effects. The instruction interpreter 226 may then send the instruction with associated attributes to an instruction scheduler 228, which may also be a module of the client device 220.

The instruction scheduler 228 may receive instructions from the instruction interpreter 226 and process attributes associated with each instruction. The instruction scheduler 228 may monitor presentation of the video to the user of the client device 220 and schedule the instructions by sending the instructions to the decoder manager 224 for execution at the appropriate time in accordance with any timestamp or other time-related attributes of each instruction. The instruction scheduler 228 may send the instructions to the decoder manager 224 as a large group, in small groups, individually, or any combination thereof. The instruction scheduler 228 may send the instructions at, or just before, the presentation time the instruction is supposed to execute so that the decoder manager 224 may execute the instructions just-in-time for the user. The instruction scheduler 228 may also send the instructions to the decoder manager 224 before the video is presented to the user so that the decoder manager 224 may not need to receive and immediately execute an instruction, but can instead wait until the appropriate time to execute the instruction.

The decoder manager 224 may receive audio and video segments from the playlist streamer 222 and may determine how to present the segments to the consumer of the client device 220. In instances, the decoder manager 224 may be able to present the content to the consumer by itself. The decoder manager 224 may also comprise components or communicatively connected to components that process and/or execute processes needed to present the received segments to the user. In the system shown in FIG. 2, the decoder manager 224 is communicatively connected to a video decoder 230 and an audio decoder 240. The decoder manager 224 may send received video segments to the video decoder 230 and received audio segments to the audio decoder 240. The video decoder 230 and the audio decoder 240 may decode the segments and then present the segments to the user. In examples, to present the segments to the user, the video decoder 230 and the audio decoder 240 may send the decoded segments to an output device, which may be a module of the client device 220 or may be a peripheral device the client device 220 is communicatively connected to.

The decoder manager 224 may receive instructions from the instruction scheduler 128 while processing the audio segments and video segments the decoder manager 224 is receiving. These instructions may direct the decoder manager 224 to perform actions before presentation of segments of the video content. For example, an instruction may direct the decoder manager 224 to replace audio of a video file for a specified amount of time. Upon receiving such an instruction, the decoder manager 224 may determine that the decoder manager 224 has already received the replacement audio from the playlist streamer 222. The decoder manager may then send the replacement audio instead of the original audio to the audio decoder 240 for the presentation time specified in the instruction. The decoder manager 224 may need to execute such instructions as they arrive, or may ready such instructions before and/or during presentation to the user if received before execution time.

The video streaming server 210, the client device 220 and associated modules such as the playlist streamer 222, the decoder manager 224, the instruction interpreter 226, the instruction scheduler 228, the video decoder 230, and the audio decoder 240 may be physical or digital and take any suitable form for their described purposes. For example, they may take the form of software components on one or more computers or modules within a single software suite. Communicative connections between these entities may be physical connections, such as those via hardware circuits or LAN cables, wireless connections, such as those via WiFi or cellular, or any other suitable communicative connection.

For example, the playlist streamer 222 may parse a received manifest file to determine the location of a video segment, the location of an audio segment associated with the video segment, and any instructions associated with the video segment, audio segment, or both. The playlist streamer 222 may then send the instructions to the instruction interpreter 226 and the video segment and audio segment information to the decoder manager 224. The instruction interpreter 226 may determine the type of each instruction and attributes associated with each instruction and send each instruction to the instruction scheduler 228. The instruction scheduler 228 may send the each instruction to the decoder manager 224 at a suitable time for injection into the presentation of the video. The decoder manager 224 may then execute each instruction during presentation to a user.

The video streaming server 210 may provide various forms of audiovisual content to subscribers. A subscriber may use a client device 220, such as a set top box, to access the content. The client device 220 may comprise or be connected to an output device, such as the subscriber's television. The subscriber may request to watch a movie from the video streaming server 210 via the client device 220. In response, the video streaming server 210 may send a manifest file to the client device 220. The client device 220 may receive the manifest file and process the manifest file at a playlist streamer 222. The playlist streamer 222 may parse the manifest file into various instructions and references to video segments and associated audio segments of the movie. In this example, there is a single instruction parsed from the manifest file. The playlist streamer 222 may send the parsed instruction to an instruction interpreter 226. Concurrently, or after the parsing of the manifest file is complete, the playlist streamer 222 may retrieve the video segments and associated audio segments from the parsed reference locations and send these segments to a decoder manager 224 for playback.

The instruction interpreter 226 may receive the parsed instruction from the playlist streamer 222 and may determine the instruction is to replace audio with audio at a given network location for two seconds, during presentation time range 5400000-5580000, which may correspond to 00:01:00-00:01:02 from the perspective of the subscriber, assuming a start time of 0 and an increment of 90,000 per second. The instruction interpreter 226 may then send the network location of the replace audio instruction back to the playlist streamer 222 to retrieve the replacement audio and send the replacement audio to the decoder manager 224. The instruction interpreter 226 may also send the replace audio instruction with the network location and presentation time range to an instruction scheduler 228. The instruction scheduler 228 may receive the replace audio instruction from the instruction interpreter 226 and process the presentation time range attributes to determine when to execute the replace instruction. The instruction scheduler 128 may monitor presentation of the content to the subscriber and schedule the replace instruction by sending the replace instruction to the decoder manager 224 in a just-in-time fashion, directly before the audio is to be replaced.

As the instruction is being parsed and processed, the decoder manager 224 may receive the video segments and associated audio segments from the playlist streamer 222 and may process the segments using a video decoder and an audio decoder. The decoders may then send this decoded content to the subscriber's television so the movie may be presented to the subscriber. During playback of the movie, the decoder manager 224 may receive the replacement audio from the playlist streamer 222 and the replace audio instruction from the instruction scheduler 228. This replace instruction may direct the decoder manager 224 to send the replacement audio to the audio decoder 240 for the specified presentation time range 00:01:00-00:01:02. As the subscriber watches the movie, the audio is replaced for the presentation time range 5400000-5580000, corresponding to 00:01:00-00:01:02 from the perspective of the subscriber.

Figure 3:
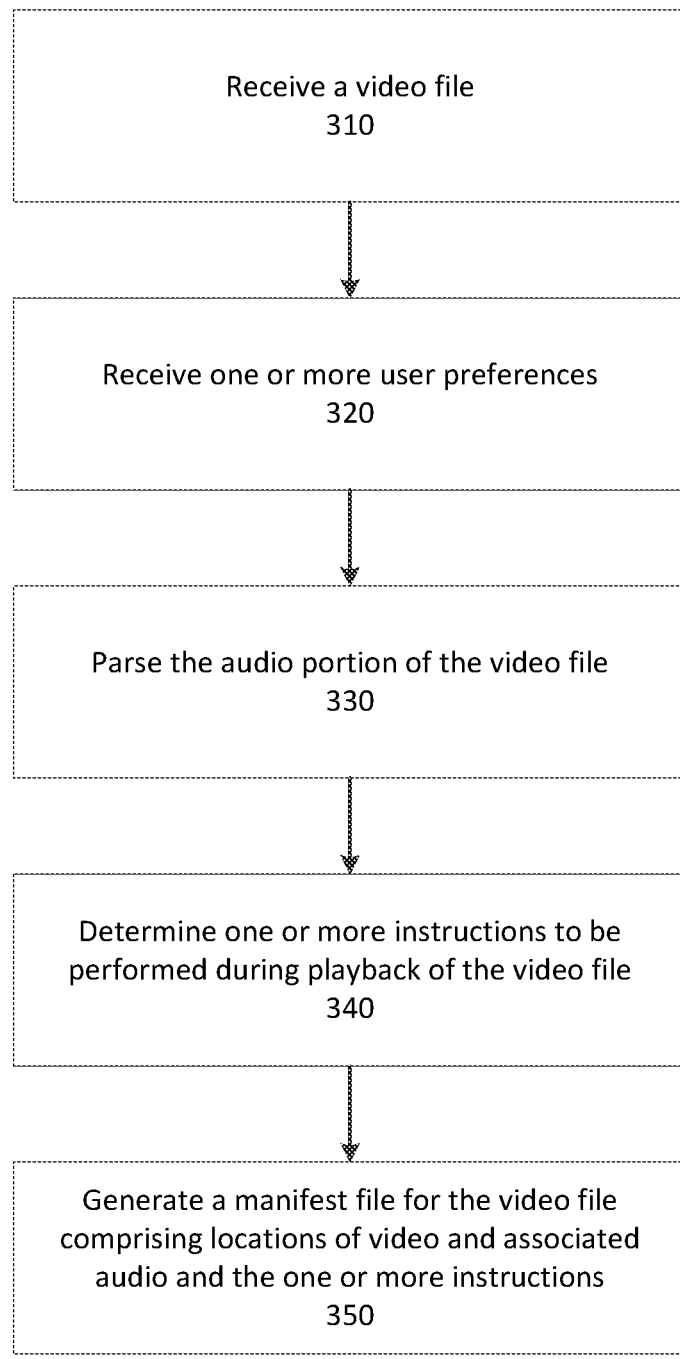
FIG. 3 is a flow diagram depicting an example of a process for generating a manifest file with custom instructions.

FIG. 3 is a flow diagram depicting an example of a process for generating a manifest for a video file that comprises network locations of segments of the video and associated audio of the video file and also comprises instructions for execution during playback of the video file based on a user's preferences. Although FIG. 3 is depicted as a sequence of blocks, the depicted sequence should not be construed as limiting the scope of the present disclosure. In various cases, aspects, and embodiments, the blocks and described operations may be altered, omitted, reordered, or performed in parallel. For purposes of illustration, reference may be made to the system described in connection with FIG. 2, although any suitable system may be used to implement the described processing.

At block 310, a content provider, or a module of a content provider such as the video streaming server 210, may receive a video file. The video file may be comprised of a video portion and an audio portion. The video portion and audio portion may have an associated presentation timeline so that both portions may be played correctly simultaneously. The video file may be received by the content provider so that the video file may be hosted for users or subscribers of the content provider to access. Users may access the video file via the use of a client device, such as the client device 220. The content provider may provide such a client device when a user subscribes to service. Alternatively, a user may supply a client device to access hosted content.

At block 320, the content provider may receive one or more user preferences. A user may provide user preferences to the content provider via the client device, a web interface, or any other feasible user interface. These user preferences may concern content restrictions such as censoring inappropriate or explicit content, highlighting specific interests or keywords, or other data relevant to viewing content.

At block 330, the content provider may parse the audio portion of the video file. The audio portion may be parsed to find key words associated with the received user preferences. Parsing may be performed by any feasible method. For example, parsing may be performed by extracting a closed captioning track from the video file, which may comprise all words spoken during playback of the video file, and determining each word of the closed captioning track. In another example, parsing may be performed by first extracting the audio track from the video file. After extracting the audio track, a speech-to-text process may be performed on the audio track to determine all words spoken during playback of the video. Any other method of parsing audio from the video file may be used. The content provider may store an index of words parsed from the audio portion of the video file and each word's corresponding timestamp of the presentation timeline of the video file.

At block 340, the content provider may determine one or more instructions to be performed during playback of the video file. The instructions may be determined based at least on the user preferences and the parsing of the audio portion of the video file. Each instruction may have a timestamp associated with the presentation timeline of the audio portion of the video file. Each instruction may also have associated metadata that may convey data relevant to the instruction or the use of the instruction. For example, the content provider may determine from the parsed audio that the video file contains foul language at specific timestamps of the presentation timeline. The user may have set a preference to mute foul language in video content. Based on this preference, the content provider may determine that there should be mute instructions at the timestamps with foul language so that the user does not hear foul language during playback. The content provider may also provide metadata with each of these instructions that may explain the audio has been muted because the audio is inappropriate. Such metadata may be displayed to the user or a troubleshooter to indicate the audio was muted purposely.

At block 350, the content provider may generate a manifest file for the video file comprising locations of video and associated audio and the one or more instructions. The content provider may generate a manifest file to play the video file. The manifest file may comprise a list of network locations of video segments and associated audio segments the client device may use for playback of the video file. The content provider may also add to the manifest file the instructions the content provider determined based on the parsed audio and user preferences. For example, such a manifest file may comprise locations of video segments and associated audio segments with instructions intermixed. In an example, all instructions may be at the beginning or end of the manifest file to be more easily parsed by the client device for playback.

Other manifests may be generated for other users based on their preferences, which may result in differing presentations of the video file to each user. These different presentations are achieved without altering or copying of the originally received video file.

Figure 4:
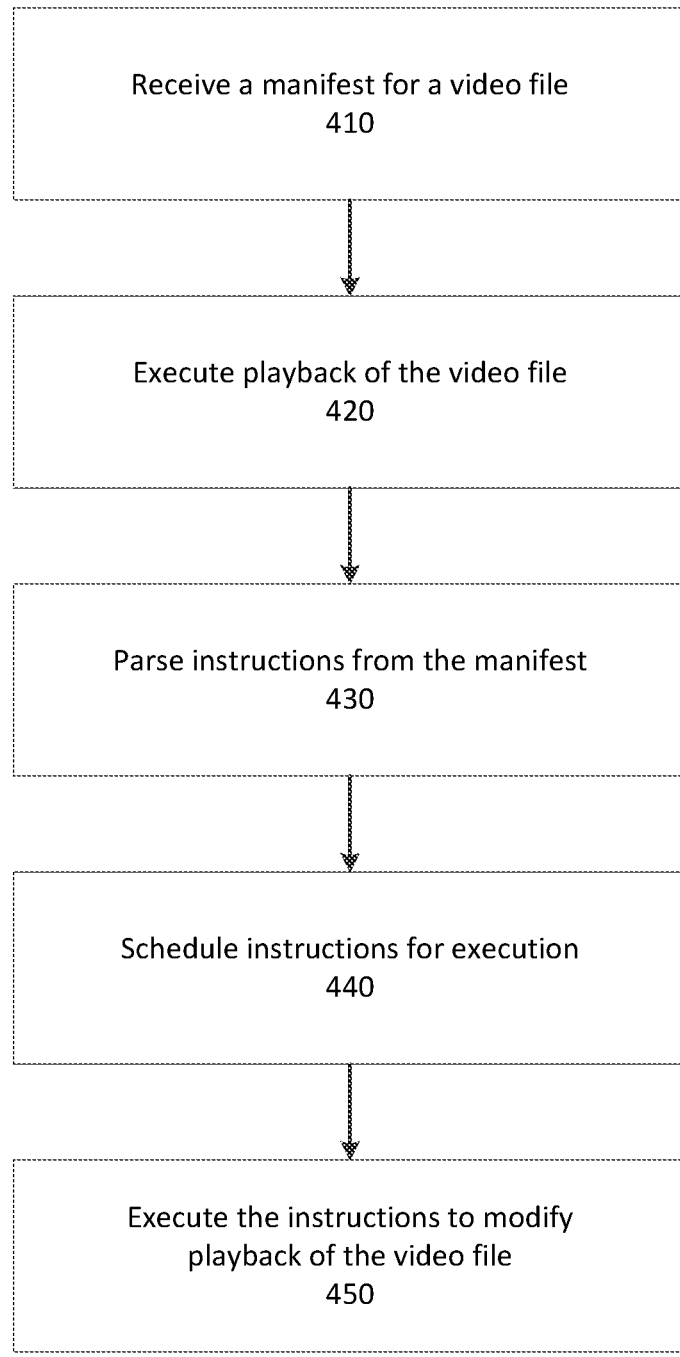
FIG. 4 is a flow diagram depicting an example of a process for executing custom instructions during video playback.

FIG. 4 is a flow diagram depicting an example of a process for presenting a video content item to a user wherein the video content has associated instructions for execution during playback. Although FIG. 4 is depicted as a sequence of blocks, the depicted sequence should not be construed as limiting the scope of the present disclosure. In various cases, aspects, and embodiments, the blocks and described operations may be altered, omitted, reordered, or performed in parallel. For purposes of illustration, reference may be made to the system described in connection with FIG. 2, although any suitable system may be used to implement the described processing.

At block 410, a client device, such as the client device 220, may receive a manifest for a video file. The manifest may arrive in response to a user request from an entity under the control of a content provider, such as the video streaming server 210. For example, a user may request to watch a movie from the client device, which may send the request to a video streamer server. The video streaming server may then respond with a manifest. The manifest may comprise network locations of video segments for playback to the user, audio segments associated with the video segments, and instructions to be executed during playback of the video file. Each instruction may have one or more associated timestamps corresponding to the presentation timeline of the video file. The client device may begin to process the manifest file at a playlist streamer, such as the playlist streamer 222. The playlist streamer may begin to process the manifest file by retrieving video segments and audio associated with the video segments from network locations in the manifest file. The playlist streamer may then send the video segments and associated audio segments to a decoder manager, such as the decoder manager 224.

At block 420, the client device may begin to execute playback of the video file by processing video segments and associated audio segments of the video file. The decoder manager may execute playback by sending the video segments to a video decoder, such as the video decoder 230, and sending the audio segments to an audio decoder, such as the audio decoder 240. The decoders may decode the video segments and audio segments and present the content of the segments to the user of the client device. Presentation may be performed via the client device if the client device has the necessary components or via a suitable output device communicatively connected to the client device.

At block 430, the client device may parse instructions from the manifest. This step may occur concurrently with executing playback of the video file. The content provider of the video file, at the video streaming server or a separate component, may insert instructions in the manifest file that are associated with presentation time stamps of the video file. The instructions may be based on one or more user preferences the user submitted to the video streaming server, such as censoring inappropriate content or language. The client device may be programmed to understand and execute such instructions. As the playlist streamer processes the video segments and associated audio segments in the manifest file, or before or after processing is completed, the playlist streamer may also parse instructions from the manifest file. After parsing the instructions, or while processing the manifest file, the playlist streamer may send each instruction to an instruction interpreter, such as the instruction interpreter 226. The instruction interpreter may determine the type of instruction received and any attributes associated with the instruction. For example, the instruction interpreter may determine that an instruction is a mute instruction with attributes of a beginning presentation time and an ending presentation time. The instruction interpreter may also determine that the mute instruction has associated metadata that may be used to inform a user about the existence of the instruction. In another example, the instruction interpreter may determine that an instruction is a replace audio instruction with attributes of a beginning presentation time, an ending presentation time, and a reference location for a replacement audio file, such as a URL, which may be used to apply an audio overlay on the audio of the video file during playback. The existence of such replace audio instructions may result in differing presentations of the video file to each user without altering or copying of the originally received video file. After the instruction is interpreted, the instruction interpreter may send the instruction to an instruction scheduler, such as the instruction scheduler 228.

At block 440, the client device may schedule instructions for execution. The instruction scheduler may monitor the processing of the decoder manager to determine the current presentation time of the playback of the video file. At a time before each instruction should be executed, based at least upon the timestamp attributes associated with the instruction, the instruction scheduler may send the instruction to the decoder manager.

At block 450, the client device may execute the instructions to modify playback of the video file. The decoder manager may receive an instruction before the instruction is to be executed for playback. At the presentation time denoted by one or more attributes of the instruction, the decoder manager may execute the instruction, which may alter playback of the video file. For example, a mute instruction may comprise a starting presentation time and an ending presentation time as attributes. The decoder manager may execute the mute instruction at the starting presentation time by not sending audio to the audio decoder. Such an action may allow the video file to continue playing without audio. If the mute instruction comprises metadata as an additional attribute, the decoder manager may display the metadata to the user via the video decoder or other user interface to notify the user that the muting was performed intentionally. The decoder manager may then resume sending audio to the audio decoder at the mute instruction's ending presentation time. In another example, a replace audio instruction may comprise a beginning presentation time, an ending presentation time, and a reference location of a replacement audio file, such as a URL, which may be used to apply an audio overlay on the audio of the video file during playback. The decoder manager may execute the replace audio instruction by retrieving the replacement audio file from the reference location and sending the replacement audio file to the audio decoder at the beginning presentation time instead of the original audio file associated with the video file. Because instructions may differ from user to user, each user may experience different playback of what may be the same content without modifying that content.

Figure 5:
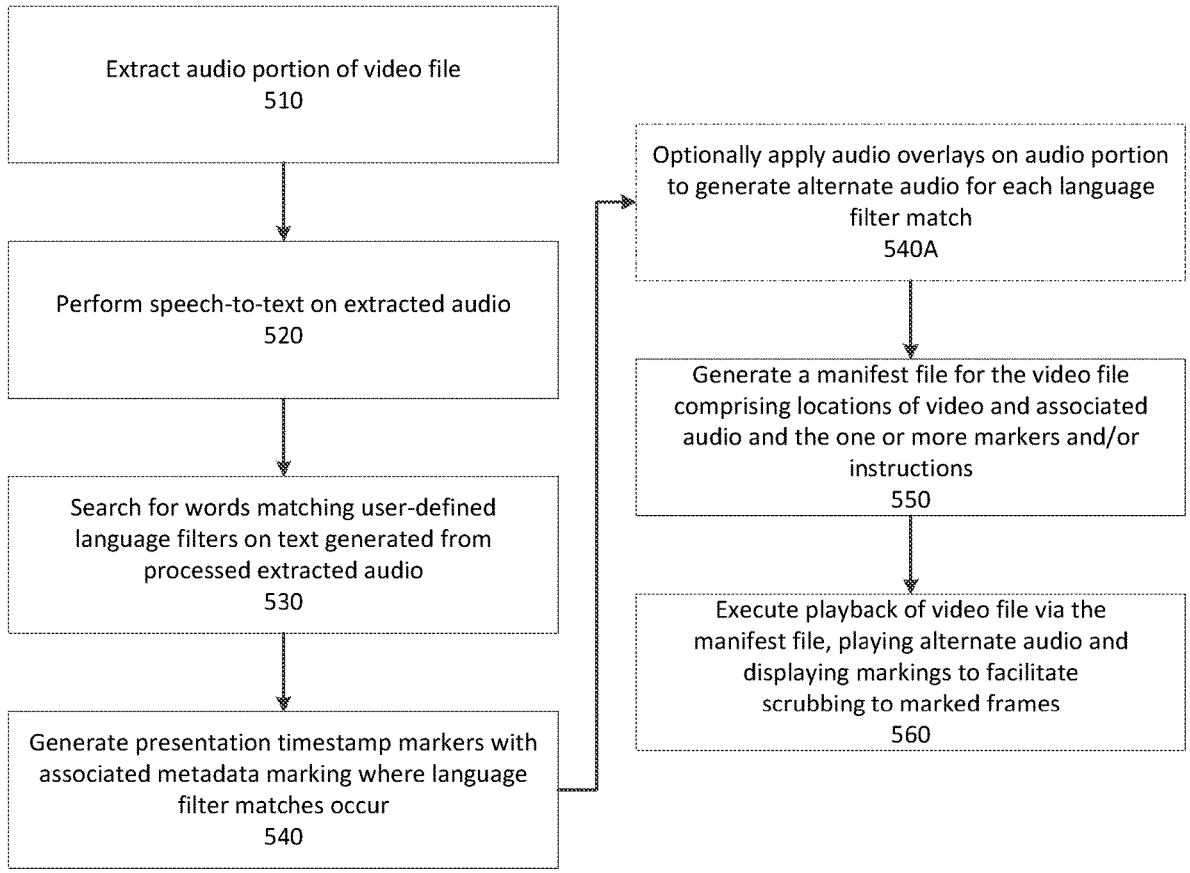
FIG. 5 is a flow diagram depicting an example of a process for generating and executing a custom manifest file.

FIG. 5 is a flow diagram depicting an example of a process for presenting a video content item to a user wherein the video content has associated instructions and/or markers corresponding to user preferences, as described herein. Markers may be associated with words and/or frames of interest to a user based on the user preferences and may facilitate scrubbing to those words and/or frames of interest. Although FIG. 5 is depicted as a sequence of blocks, the depicted sequence should not be construed as limiting the scope of the present disclosure. In various cases, aspects, and embodiments, the blocks and described operations may be altered, omitted, reordered, or performed in parallel. For purposes of illustration, reference may be made to the system described in connection with FIG. 2, although any suitable system may be used to implement the described processing.

In FIG. 5 it is assumed that a content provider, or a module of a content provider such as the video streaming server 210, has received a video file. The video file may be comprised of a video portion and an audio portion. The video portion and audio portion may have an associated presentation timeline so that both portions may be played correctly at the same time. The video file may be received by the content provider so that the video file may be hosted for users or subscribers of the content provider to access. Users may access the video file via the use of a client device, such as the client device 220. The content provider may provide such a client device when a user subscribes to service. Alternatively, a user may supply a client device to access hosted content. It is also assumed the content provider has received one or more user preferences. A user may provide user preferences to the content provider via the client device, a web interface, or any other feasible user interface. These user preferences may concern content restrictions such as censoring inappropriate or explicit content, specific interests or keywords, or other data relevant to viewing content. The content provider may create one or more language filters based on the received user preferences. Such language filters may allow the content provider to mark words of interest to the user. For example, if a user submits a preference to censor foul language, the content provider may create a language filter to find foul language contained in the video file.

At block 510, the content provider may extract the audio portion of the video file. Extracting the audio portion of the video file may be performed by any feasible method. After the audio portion of the video file is extracted, the content provider may process the audio portion of the video file without affecting the video portion of the video file.

At block 520, a speech-to-text process may be performed on the audio track to determine words spoken during playback of the video. Any feasible speech-to-text method may be used. The content provider may store an index of words parsed from the audio portion of the video file and each word's corresponding timestamp of the presentation timeline of the video file.

At block 530, the content provider may search for words matching user-defined language filters on the text generated from the processed extracted audio. As described above, the content provider may create one or more language filters based on the received user preferences. The content provider may then search the processed audio portion of the video file for words that match the one or more language filters. For example, if the user preferences indicate a desire to censor or replace foul language of a video file, the content provider may create a filter to find foul language contained in the audio portion of the video file. Such a process may occur after the audio portion has been processed into a structure searchable by the content provider, such as an array of words and associated timestamps.

At block 540, the content provider may generate presentation timestamp markers with associated metadata marking where language filter matches occur. As the content provider finds words that match the one or more language filters, the content provider may generate a marker with a presentation timestamp for each matched word where the presentation timestamp corresponds to the matched word's presentation time in the presentation timeline of the video file. Each marker may also have associated metadata that may convey data relevant to the use of the marker. Each marker may be suitable for use in a manifest file, such as an HLS manifest file, as described above. In an example, the user may have set preferences to avoid explicit words in video content. As a result, the content provider may find and generate markers for foul language in the processed audio. Each marker may comprise a timestamp associated with the word's presentation timestamp in the presentation timeline. Each marker may also comprise metadata explaining that foul language was found. In another example, the user may have set preferences to highlight each time a certain celebrity's name is mentioned. The content provider may find each occurrence of that name in the processed audio and generate a marker for each occurrence, with the marker having a presentation timestamp corresponding to that of the name's occurrence in the presentation timeline and metadata denoting the name.

The processing of block 540A may or may not be performed based on the received user preferences. At block 540A, the content provider may optionally apply audio overlays on the audio portion of the video file to generate alternate audio for each language filter match. Depending on the received user preferences, an instruction may be associated with a marker. For each matched word, the content provider may determine one or more instructions that may apply an audio overlay on the audio of the video file during playback. During playback, the audio overlay may be played instead of the original audio of the video file for the specified presentation timestamps. Such instructions may be determined based at least on the received user preferences and the matched word. For example, based on a user's preference to censor explicit language, the content provider may determine that there should be mute instructions at presentation timestamps having foul language so that the user does not hear foul language during playback. As a result, the content provider may generate a mute instruction for each presentation time foul language is found in the processed audio. During playback, the mute instruction will play instead of the original audio at the specified timestamps. In another example, instead of being muted, foul language may be replaced with a "beep" or other censoring audio, such as a voice dub. In such an example, the audio overlay may comprise alternate audio, and the instruction may comprise a location of the alternate audio.

At block 550, the content provider may generate a manifest file for the video file comprising network locations (e.g., URLs) of segments of video and associated audio and the one or more markers and/or instructions. The content provider may generate a manifest file to play the video file. The manifest file may comprise a list of network locations of video segments and associated audio segments the client device may use for playback of the video file. The content provider may also add to the manifest file the presentation timestamp markers the content provider generated based on the received user preferences. For example, such a manifest file may comprise locations of video segments and associated audio segments with markers interspersed. In an example, all instructions may be at the beginning or end of the manifest file to be more easily parsed by the client device for playback. A manifest file has now been generated for the video file with markers and/or instructions for a specific user based on the user's preferences. Other manifests may be generated for other users based on their preferences, which may result in differing presentations of the video file to each user without altering or copying of the originally received video file.

At block 560, a client device of the user may execute playback of the video file via the generated manifest file, playing any alternate audio and displaying markings to a user of the client device to facilitate scrubbing to marked frames. The client device may receive the generated manifest file based on the user's preferences. The client device may process the manifest file in a manner in accordance with that of FIG. 4. However, the client device may also process markers. For markers, a decoder manager, such as the decoder manager 224, may present metadata associated with one or more markers to the user via a video decoder, such as the video decoder 230. Such metadata may be presented to the user to display presentation timestamps with markers of interest, such as those timestamps when a celebrity's name is mentioned. The client device may have functionality such that the user may scrub to the frames with markers of interest without watching intervening video. Similar functionality may also be achieved by using seek instructions with such markers. For example, a user may use a button or other input mechanism to quickly skip to the presentation time of each marker.

Figure 6:
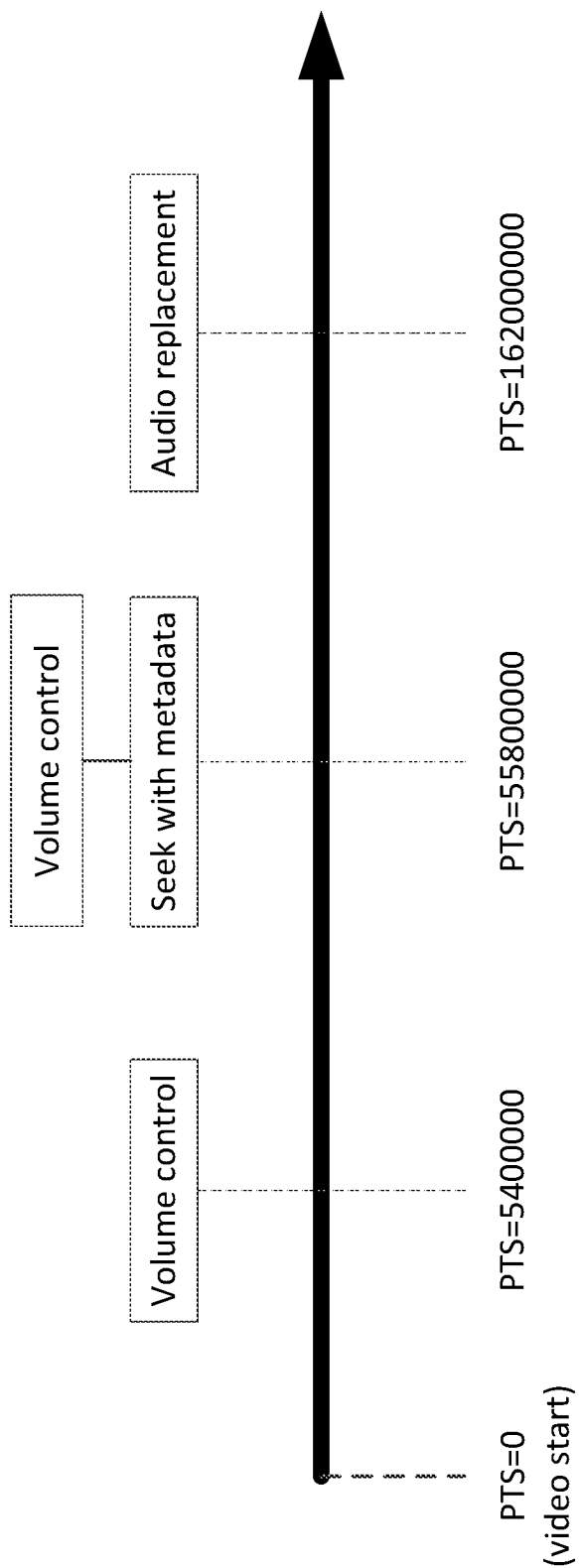
FIG. 6 shows a presentation timeline with instructions being executed at various presentation timestamps.

FIG. 6 shows a visualization of an example of a presentation timeline with instructions being executed at various presentation timestamps of a video file. A video file may have an associated presentation timeline. A specific point on the presentation timeline may be called a presentation timestamp (PTS). Each PTS may have an associated video segment and an associated audio segment. For example, a PTS may be associated with a particular video frame and may be associated with a particular audio word or syllable. In the example of FIG. 6, the presentation timeline begins at PTS=0. From PTS=0 to PTS=5400000, the video file may play normally.

At PTS=5400000, a volume control instruction may be executed to alter the presentation of the audio of the video file for a specified amount of time. The volume control instruction may be of any suitable form, and may take a form as described above. The volume control instruction may have an associated value and an associated ending presentation time. After the volume control instruction reaches the associated ending presentation time, the video file may resume normal playback.

At PTS=55800000, two instructions may be executed, a volume control instruction and a seek instruction with metadata. The volume control instruction may have an associated volume value, such as zero for mute, and an associated ending presentation time. The seek instruction with metadata may have associated metadata comprising keywords to search for in the audio portion of the video file and an associated ending presentation time to stop searching. The seek instruction may search for keywords included in the metadata for a specified amount of presentation time ahead in the presentation timeline. Assuming the volume control instruction has reached its associated ending presentation time, if a keyword is found in the specified amount of presentation time, the video file may resume normal playback. Otherwise, normal playback may resume when the seek instruction reaches the seek instruction's associated ending presentation time. In either case, if the volume control instruction has not reached the volume control instruction's associated ending presentation time, playback may resume with the specified volume until the ending presentation time is reached.

At PTS=162000000, an audio replacement instruction may be executed and may have an associated reference to replacement audio and an associated ending presentation time. Playback may comprise the video portion of the video file with the replacement audio referenced by the audio replacement instruction. The video file may resume normal playback after the associated ending presentation time of the audio replacement instruction.

Figure 7:
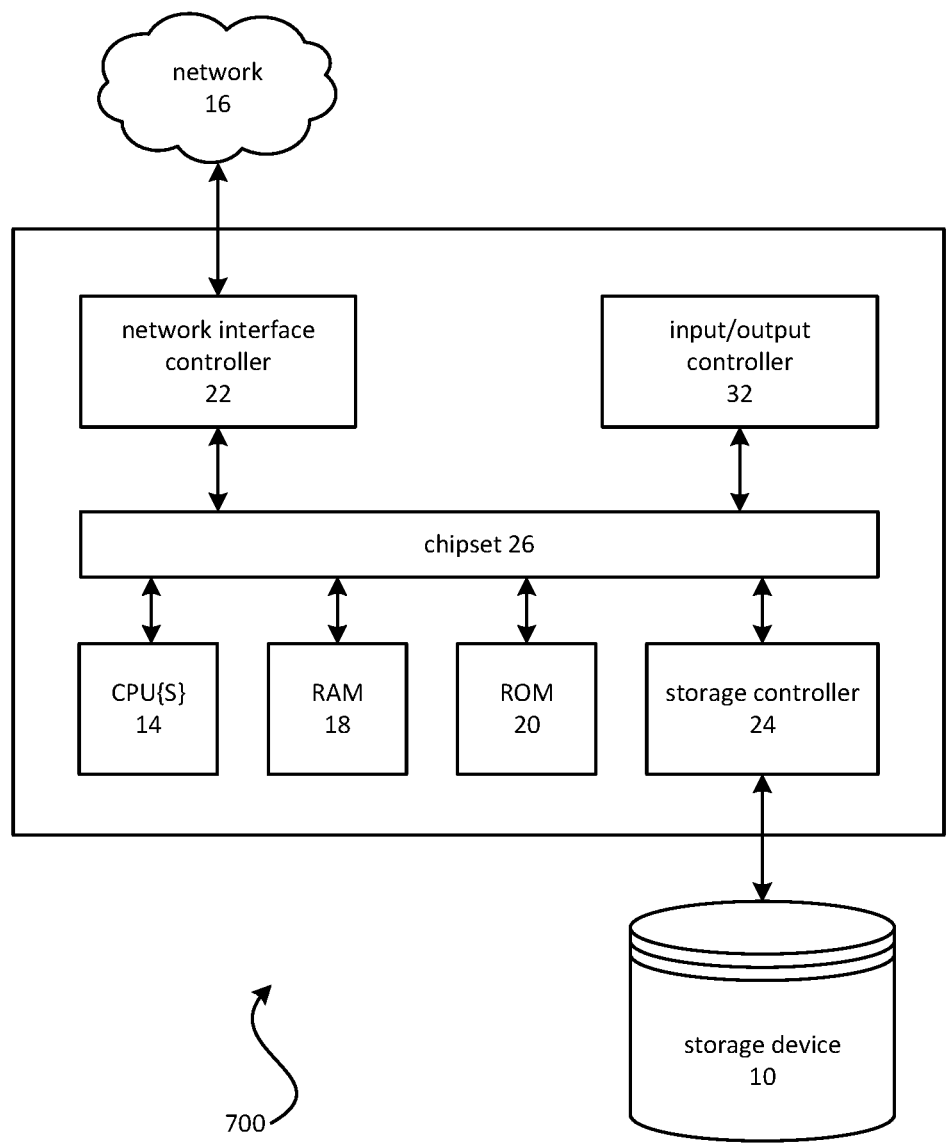
FIG. 7 shows an example computing system.

FIG. 7 shows a computing device that may be used in various components, such as any of the various devices shown in FIGS. 1-2. The computer architecture shown in FIG. 7 may correspond to a set-top box, remote control device, home automation system, desktop computer, laptop, tablet, network appliance, e-reader, smartphone, the content provider 110, the client device 120, the content parser 122, the playback module 124, the instruction interpreter 126, the instruction scheduler 128, the output device 130, the video streaming server 210, the client device 220, the playlist streamer 222, the decoder manager 224, the instruction interpreter 226, the instruction scheduler 228, the video decoder 230, the audio decoder 240, or other computing device, and may be utilized to execute any aspects of the computers described herein, such as to implement the operating procedures of FIGS. 3-5.

A computing device 700 may include a baseboard, or "motherboard," which is a printed circuit board to which a multitude of components or devices may be connected by way of a system bus or other electrical communication paths. One or more central processing units ("CPUs") 14 may operate in conjunction with a chipset 26. The CPU(s) 14 may be standard programmable processors that perform arithmetic and logical operations necessary for the operation of the computing device 700.

The CPU(s) 14 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 14 may, in various embodiments, be augmented with or replaced by other processing units, such as GPU(s) (not shown). GPU(s) may comprise processing units specialized for, but not necessarily limited to, highly parallel computations, such as graphics and other visualization-related processing.

A chipset 26 may provide an interface between the CPU(s) 14 and the remainder of the components and devices on the baseboard. The chipset 26 may provide an interface to a random access memory ("RAM") 18 used as the main memory in the computing device 700. The chipset 26 may further provide an interface to a computer-readable storage medium, such as a read-only memory ("ROM") 20 or non-volatile RAM ("NVRAM") (not shown), for storing basic routines that may help to start up the computing device 700 and to transfer information between the various components and devices. The ROM 20 or NVRAM may also store other software components necessary for the operation of the computing device 700 in accordance with the aspects described herein.

The computing device 700 may operate in a networked environment using logical connections to remote computing nodes and computer systems through a local area network ("LAN") 16. The chipset 26 may include functionality for providing network connectivity through a network interface controller (NIC) 22, such as a gigabit Ethernet adapter. The NIC 22 may be capable of connecting the computing device 400 to other computing nodes over the network 16. It should be appreciated that multiple NICs 22 may be present in the computing device 700, connecting the computing device to other types of networks and remote computer systems.

The computing device 700 may be connected to a mass storage device 10 that provides non-volatile storage for the computing device 700. The mass storage device 10 may store system programs, application programs, other program modules, and data, used to implement the processes and systems described in greater detail herein. The mass storage device 10 may be connected to computing device 700 through a storage controller 24 connected to the chipset 26. The mass storage device 10 may consist of one or more physical storage units. A storage controller 24 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 700 may store data on the mass storage device 10 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 10 is characterized as primary or secondary storage and the like.

For example, the computing device 700 may store information to the mass storage device 10 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 10 by detecting the physical states or characteristics of one or more particular locations within the physical storage units.

The computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that can be used to store the desired information in a non-transitory fashion.

The mass storage device 10 may store an operating system utilized to control the operation of the computing device 700. For example, the operating system may comprise a version of the LINUX operating system. In another example, the operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized in some embodiments. It should be appreciated that other operating systems may also be utilized. The mass storage device 10 may store other system or application programs and data utilized by the computing device 700.

The mass storage device 10 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 14 transition between states, as described above. The computing device 700 may have access to computer-readable storage media storing computer-executable instructions, which, when executed by the computing device 700, may perform operating procedures shown in FIGS. 3-5.

The computing device 700 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing node may be a physical computing device, such as the computing device 700 of FIG. 7. A computing node may also include a virtual machine host process and one or more virtual machine instances operating on a physical computing device, such as the computing device 700. Computer-executable instructions may be executed by the physical hardware of a computing device indirectly through interpretation and/or execution of instructions stored and executed in the context of a virtual machine.

It is to be understood that the described methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the described methods and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods and systems. This applies to all aspects of this application including, but not limited to, operations in disclosed methods. Thus, if there are a variety of additional operations that can be performed it is understood that each of these additional operations can be performed with any specific embodiment or combination of embodiments of the disclosed methods.

The present methods and systems may be understood more readily by reference to the aforementioned detailed description of preferred embodiments and the examples included therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the disclosed embodiments may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations can be made without departing from the scope or spirit of the present disclosure. Other embodiments will be apparent to those skilled in the art from consideration of the specification and practices described. It is intended that the specification and example figures be considered as exemplary only, with a true scope and spirit being indicated by the following claims.

What is claimed:

1. A method comprising:
   receiving content comprising an audio portion;
   determining, by a computing device, a time point of the audio portion at which the audio portion comprises a keyword;
   determining one or more instructions for modifying output of the content at the time point of the audio portion at which the audio portion comprises the keyword; and
   causing sending of a manifest, for the content, comprising:
      indications of a plurality of locations of video segments of the content,
      indications of a plurality of locations of audio segments associated with the video segments, and
      the one or more instructions for modifying output of the content at the time point.

2. The method of claim 1, wherein the determining the one or more instructions is based on one or more user preferences.

3. The method of claim 2, wherein the one or more user preferences comprise content restrictions.

4. The method of claim 2, wherein the one or more user preferences comprise the keyword.

5. The method of claim 4, wherein an instruction of the one or more instructions comprises a seek instruction having associated metadata comprising the keyword.

6. The method of claim 1, further comprising generating, based at least on the determining the one or more instructions for modifying output of the content, alternate audio for output at a time indicated by the one or more instructions.

7. The method of claim 6, wherein the alternate audio comprises at least one of a silence, a tone, or a dub.

8. The method of claim 6, wherein the determining the one or more instructions comprises extracting a closed captioning track from the content.

9. The method of claim 1, wherein the determining the one or more instructions comprises:
extracting the audio portion of the content; and
executing a speech-to-text process on the audio portion of the content.

10. The method of claim 1, wherein an instruction of the one or more instructions comprises a volume instruction comprising an associated starting timestamp, an associated ending timestamp, and an associated value indicating a volume adjustment to be made during output between the times indicated by the starting and ending timestamps.

11. The method of claim 10, wherein the associated value of the volume instruction indicates that volume is to be muted.

12. A method comprising:
receiving, by a computing device, a manifest for content, wherein the manifest comprises:
indications of a plurality of locations of video segments of the content,
indications of a plurality of locations of audio segments associated with the video segments, and
one or more instructions to modify output of the content at a time point at which one or more of the audio segments comprises a keyword;
performing, based at least on the indications of the plurality of locations of video segments of the content and the indications of the plurality of locations of audio segments associated with the video segments, output of the content;
parsing the instructions from the manifest; and
causing execution of the one or more instructions to modify output of the content.

13. The method of claim 12, wherein the parsing comprises:
identifying each instruction from the manifest;
determining a type associated with each instruction; and
determining one or more attributes associated with each instruction.

14. The method of claim 12,
wherein the one or more instructions comprise an identification of an associated replacement audio segment to be output during the time point at which the one or more of the audio segments comprises the keyword.

15. The method of claim 14, wherein the one or more instructions modify output of the content by replacing a portion of the audio segments of the content.

16. The method of claim 12, wherein the causing execution of the one or more instructions comprises:
monitoring the output of the content; and
scheduling each instruction for execution before a time corresponding to an associated time of the instruction.

17. The method of claim 12, wherein the causing execution of the one or more instructions comprises executing at least two instructions concurrently.

18. The method of claim 12, wherein the causing execution of the one or more instructions comprises causing output of metadata associated with an instruction when a timestamp associated with a portion of the audio segments matches a presentation time of output of the content.

19. The method of claim 18, wherein the metadata facilitates scrubbing to the timestamp associated with the portion of the audio segments.

20. The method of claim 18, wherein the metadata facilitates seeking via a seek instruction.

* * * * *